United States Patent
Wang et al.

(10) Patent No.: US 12,517,050 B2
(45) Date of Patent: Jan. 6, 2026

(54) METHOD OF SCREENING MICROPLASTIC PARTICLES USING A HYPERSPECTRAL IMAGING DEVICE

(71) Applicant: Hong Kong Applied Science And Technology Research Institute Co., Ltd., Shatin (HK)

(72) Inventors: Naixiang Wang, New Territories (HK); Mengting Wu, Shatin (HK); Ming Leung Vincent Tse, Tuen Mun (HK); Chun Chung Chan, Kowloon (HK)

(73) Assignee: Hong Kong Applied Science And Technology Research Institue Co., Ltd, Shatin (HK)

( * ) Notice: Subject to any disclaimer, the term of this patent is extended or adjusted under 35 U.S.C. 154(b) by 143 days.

(21) Appl. No.: 18/602,156

(22) Filed: Mar. 12, 2024

(65) Prior Publication Data

US 2025/0290853 A1    Sep. 18, 2025

(51) Int. Cl.
*G01N 21/64* (2006.01)
*G01N 33/44* (2006.01)

(52) U.S. Cl.
CPC ........ *G01N 21/643* (2013.01); *G01N 21/6458* (2013.01); *G01N 33/442* (2013.01); *G01N 2021/6439* (2013.01); *G01N 2201/06113* (2013.01)

(58) Field of Classification Search
CPC ............. G01N 21/643; G01N 21/6458; G01N 33/442; G01N 2021/6439; G01N 2201/06113
See application file for complete search history.

(56) References Cited

U.S. PATENT DOCUMENTS

2023/0408396 A1*  12/2023  Hanay ................ G01N 15/0266

FOREIGN PATENT DOCUMENTS

| CN | 110006723 A | 7/2019 |
|---|---|---|
| CN | 110907429 A | 3/2020 |
| CN | 111521599 A | 8/2020 |
| CN | 112730368 A | 4/2021 |
| CN | 113155753 A | 7/2021 |
| CN | 113533239 A | 10/2021 |
| CN | 115376126 A | 11/2022 |
| CN | 115479906 A | 12/2022 |

(Continued)

OTHER PUBLICATIONS

Konde et al, "Nile Red staining for detection of microplastics: a comprehensive study on th eemission spectra", Feb. 16, 2023, Publisher: Research Square.

(Continued)

*Primary Examiner* — Mark R Gaworecki
(74) *Attorney, Agent, or Firm* — GableGotwals

(57) ABSTRACT

A method of screening a sample of microplastic particles which have been stained using a fluorescent dye. The method comprises line scanning the stained sample of microplastic particles using a line laser, and collecting an emission signal from the sample of microplastic particles using a visible light range hyperspectral imaging device such as a camera. The collected emission signal is analyzed to determine any one or more of: size, distribution, and plastics material types of the microplastic particles in the sample.

20 Claims, 11 Drawing Sheets
(10 of 11 Drawing Sheet(s) Filed in Color)

(56) References Cited

FOREIGN PATENT DOCUMENTS

| CN | 115561200 A | 1/2023 | | |
|---|---|---|---|---|
| KR | 20220033940 A | 3/2022 | | |
| WO | WO-2020169591 A1 | * | 8/2020 | ............ C02F 1/5245 |
| WO | WO-2021144321 A1 | * | 7/2021 | ......... G01N 15/1459 |
| WO | 2022114053 A1 | 6/2022 | | |
| WO | 2022239852 A1 | 11/2022 | | |

OTHER PUBLICATIONS

Pizzichetti et al, "Evaluation of membranes performance for microplastic removal in a simple and low-costs filtration system", Case Studies in Chemical and Environmental Engineering (2021), , Publisher: elsevier.

Chatterjee et al, "Microplastics in our oceans and marine health", Reinventing Plastics, Mar. 1, 2019, Publisher: Facts Reports; Field Actions Science Reports.

* cited by examiner

◌ = 12A

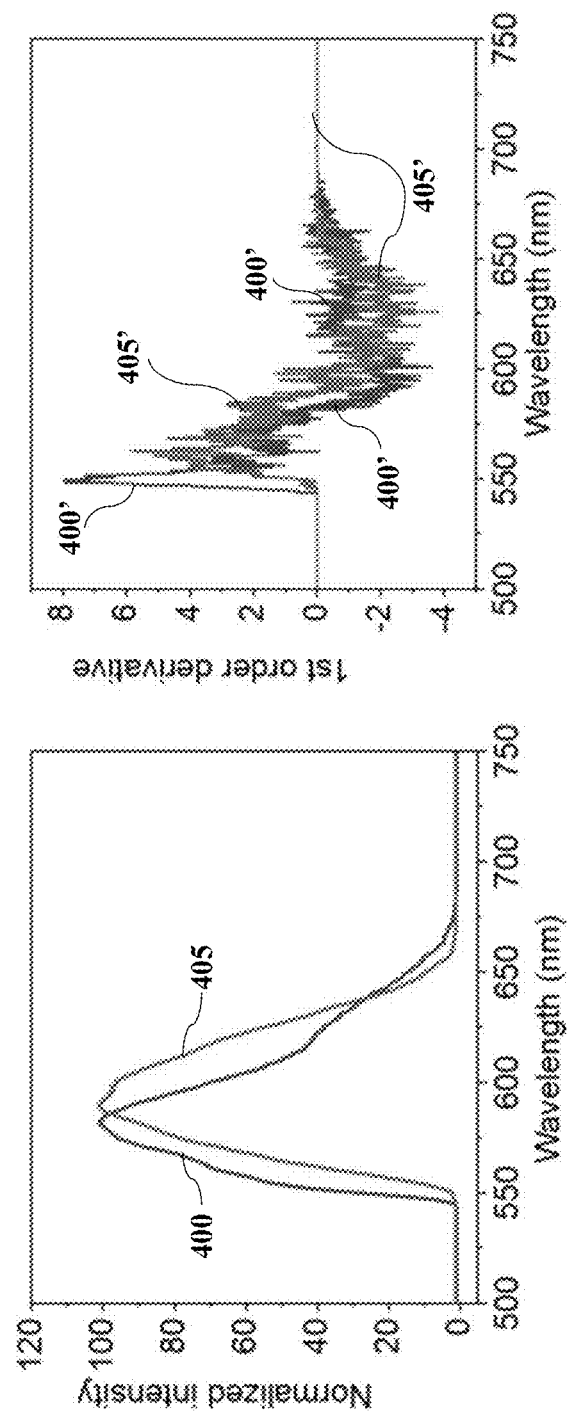

METHOD OF SCREENING MICROPLASTIC PARTICLES USING A HYPERSPECTRAL IMAGING DEVICE

FIELD OF THE INVENTION

The invention relates to a method of screening microplastic particles using a hyperspectral imaging device such as a hyperspectral imaging camera. More particularly, but not exclusively, the method relates to a method of identifying plastics material types of microplastic particles using microscopic hyperspectral imaging.

BACKGROUND OF THE INVENTION

Global plastics production is growing exponentially to a current global production of about 400 million tonnes, about half of which comprises single-use plastics such as bags, straws, bottles, food containers, pipes, etc. It is estimated that at least 14 million tonnes of single-use plastics material enters rivers, lakes, and oceans annually amounting to 50% to 80% of waterway and ocean litter. Much of the remainder of single-use plastics ends up in landfills or being incinerated with the inherent pollution issues which arise from these methods of disposal.

Most single-use plastics are not biodegradable and may persist in the environment for hundreds to thousands of years. Much of the waste plastics material breaks up into small particles, commonly referred to as microplastics or microplastic particles. This is especially true of plastics material waste which enters rivers, lakes, and oceans where much of such waste is caused to break up by water currents, wave action, erosion, and the like.

More specifically, microplastics are synthetic organic polymer particles in the size range of 0.001 mm to 5 mm. Owing to their small size, random distribution, and lack of biodegradability, microplastics are not removed by water treatment plants such as sewage treatment plants and typically end up in the waterways and oceans. The particles have a higher propensity to absorb toxic chemicals than other types of waste with the risk that the particles with their absorbed toxic chemicals pass into human and animal food chains. It has been observed that many fish species mistake microplastic particles as small sea creatures such as plankton which they ingest as food. The microplastic particles ingested by such fish may pass into the flesh of the fish which may later be consumed by humans and animals.

Conventional approaches for microplastic detection typically comprise assembling a commercial-grade spectrometer or hyperspectral camera with a microscope without much integration of their respective functions. These approaches tend to be bulky, slow, expensive, and lack hardware/software compatibility, which are not suitable for small-scale implementation such as consumer/household uses.

Therefore, it is desired to achieve, among other things, one or more of the following: (i) fast screening of microplastic particles by a low-cost portable optical system; (ii) realize spatial resolution of particle size as low as ~10 μm, which is crucial for food and water inspection, considering the size distribution of microplastic particles; and (iii) identify and distinguish different plastics material types of microplastic particles.

OBJECTS OF THE INVENTION

An object of the invention is to mitigate or obviate to some degree one or more problems associated with known methods of microplastic particle detection and/or identification.

The above object is met by the combination of features of the main claims; the sub-claims disclose further advantageous embodiments of the invention.

Another object of the invention is to provide fluorescent tagging of microplastic particles combined with line-scan visible range hyperspectral imaging for fast screening of microplastic particles at high spatial resolution and low cost.

Another object of the invention is to provide a solvatochromic and emission spectrum feature based microplastic classification algorithm for identification of different plastics material types of microplastic particles.

Yet another object of the invention is to provide a dynamic range extension and signal/noise ratio enhancement for microplastic particle detection in real samples, e.g., bottled water and sea salt.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of screening a sample of microplastic particles which have been stained using a fluorescent dye. The method comprises: line scanning the stained sample of microplastic particles using a line laser; collecting an emission signal from the sample of microplastic particles using a visible light range hyperspectral imaging device; and analyzing the collected emission signal to determine any one or more of: size, distribution, and plastics material types of the microplastic particles in the sample.

In a second main aspect, the invention provides a system for screening a sample of microplastic particles, said sample of microplastic particles having been stained using a fluorescent dye, the system comprising: a sample holder comprising a target screening area, the sample of microplastic particles being placed in or on the sample holder; a line laser arranged to line scan the target screening area; a hyperspectral imaging device arranged to receive an emission signal reflected from the target screening area; and a processor module for analyzing the collected emission signal to determine any one or more of: size, distribution, and plastics material types of the microplastic particles in the sample.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The patent or application file contains at least one drawing executed in color. Copies of this patent or application publication with color drawings will be provided by the Office upon request and payment of the necessary fee.

The foregoing and further features of the present invention will be apparent from the following description of preferred embodiments which are provided by way of example only in connection with the accompanying figures, of which:

FIG. 8B is a graph comparing the reflected emission intensity-wavelength profiles for PE and PET in accordance with the method of the invention;

FIG. 8A is a graph comparing the first order derivatives of the reflected emission intensity-wavelength profiles for PE and PET;

DESCRIPTION OF PREFERRED EMBODIMENTS

Figure 1:
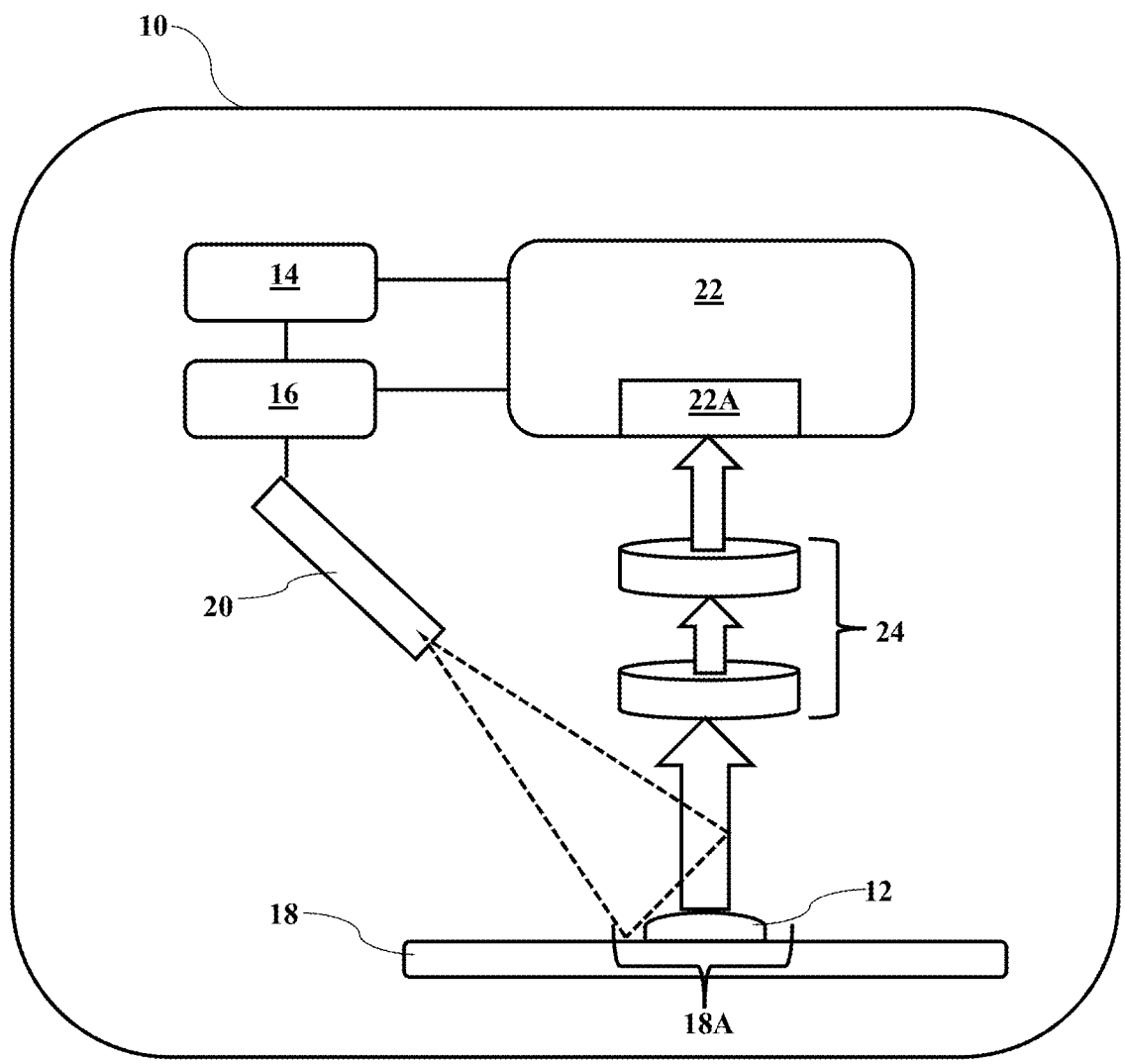
FIG. 1 is a schematic block diagram of a system of one embodiment for screening a sample of microplastic particles in accordance with the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the drawings may be implemented in various forms of hardware, software, or combinations thereof. These elements may be implemented in a combination of hardware and software on one or more appropriately programmed general-purpose devices, which may include a processor, memory, and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the following description, a reference to "microplastics" is to be taken as a reference to "microplastic particles" and vice-versa.

The proposed invention relates to a portable, affordable, microscopic hyperspectral imaging device operating in line-scan mode in the visible light range. The invention provides any one or more of: (i) a fluorescent tagging process combined with line-scan visible range hyperspectral imaging for fast screening of microplastic particles at high spatial resolution and low cost; (ii) a solvatochromic and emission spectrum feature based microplastics classification algorithm for identification of different types of microplastics; and (iii) a dynamic range extension and signal/noise ratio enhancement for microplastics detection in real samples (bottled water, sea salt).

Referring to FIG. 1, shown is a schematic diagram of a system 10 for screening a sample of microplastic particles 12 in accordance with one embodiment of the invention. The sample of microplastic particles 12 has been pre-processed by staining using a fluorescent dye. Preferably, the fluorescent dye comprises: a lipophilic dye; a hydrophobic dye; or a lipophilic and hydrophobic dye. One such dye comprises Nile Red. This is the preferred dye for embodiments of the invention and will be referred to in the description of the preferred embodiments and methods of the invention. Nile Red is a hydrophobic fluorescent dye having excellent solubility in nonpolar solvents and compatibility with hydrophobic environments. It exhibits strong fluorescence emission in the orange-red regions and can be used for lipid staining and tracking in plastic-based systems. Nile Red exhibits properties of a near-ideal lysochrome. It is strongly fluorescent, but only in the presence of a hydrophobic environment. Therefore, the dye is preferably first dissolved in one or more solvents prior to the sample of microplastic particles 12 being stained. Suitable solvents comprise ethanol and acetone and the dye may be dissolved in a mixture of ethanol and acetone. The process of staining the sample of microplastic particles 12 using the fluorescent dye is conducted for a predetermined incubation period. The incubation period could be a period lasting from 30 minutes to one hour, but it will be understood that the incubation period can be determined without undue experimentation.

Whilst Nile Red is the preferred choice of fluorescent dye, in a hydrophobic environment, it is important to select a fluorescent dye that exhibits good solubility and stability in nonpolar or hydrophobic solvents. Some other fluorescent dyes that could be used in the present invention for plastics in hydrophobic environments include: Bodipy (boron dipyrromethene) dyes, Pyrene dyes, Coumarin dyes, and Squaraine dyes.

The system 10 comprises a memory module 14 and a processor module 16. The memory module 14 stores machine-readable instructions which, when executed by the processor module 16, configure the system 10 to implement the methods of the invention as hereinafter described.

In one embodiment, the system 10 is a stand-alone device.

In another embodiment, the system 10 is connected to a communications network (not shown).

The memory module 14 may comprise a database for storing templates. Alternatively, the system 10 may connect to a remote template database via the communication network.

The sample of microplastic particles 12 is placed in or on a sample holder 18 comprising a target screening area 18A. The sample of microplastic particles 12 may be presented on a glass substrate on the sample holder 18.

The sample holder 18 may be movable under control of the processor module 16 to facilitate line scanning of the sample of microplastic particles 12 by a line laser 20, also under the control of the processor module 16. Alternatively, or additionally, the line laser 20 is movable to facilitate line scanning of the sample of microplastic particles 12. The line laser 20 preferably comprises a diode laser configured to line scan the target screening area 18A and thus to line scan the sample of microplastic particles 12 on the sample holder 18. The line laser 20 is configured to emit light for line scanning in the visible light range.

In one embodiment, the sample holder 18 comprises a conveyor system, feed system, or the like to facilitate continuous screening of multiple samples of microplastic particles 12.

Figure 2:
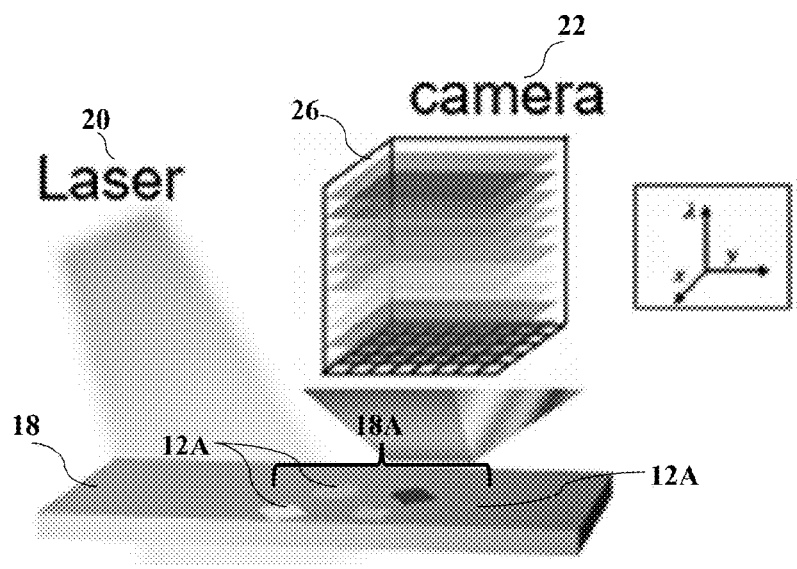
FIG. 2 is a schematic diagram illustrating how the system of FIG. 1 generates a hyperspectral data cube.
Figure 3:
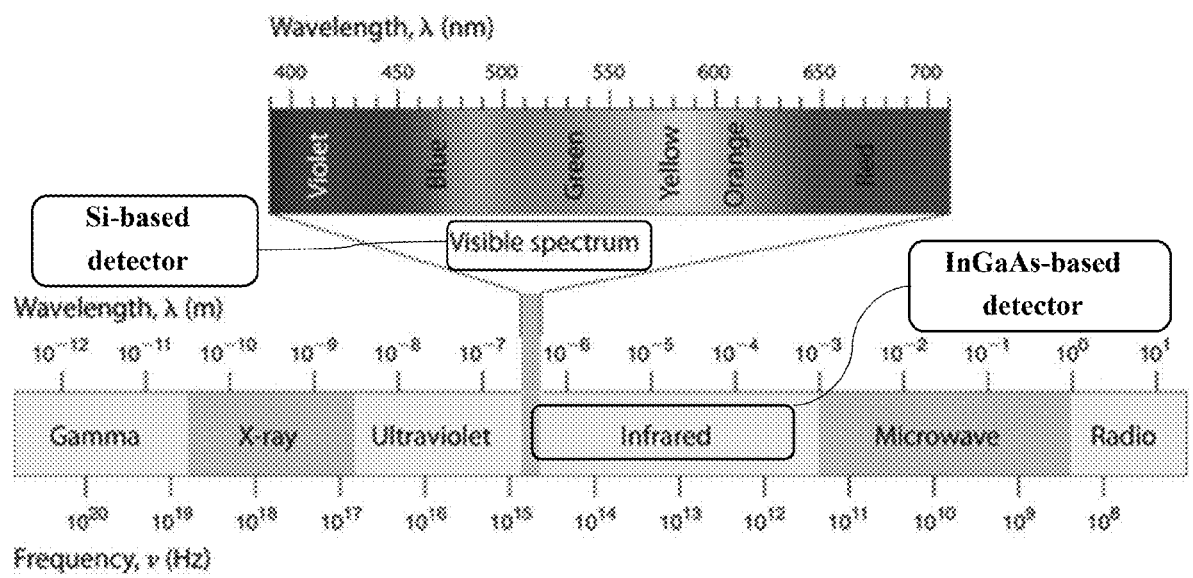
FIG. 3 illustrates the preferred electromagnetic spectrum of a hyperspectral imaging device of the system of FIG. 1.

The system 10 comprises a hyperspectral imaging device such as a hyperspectral imaging camera 22 arranged to receive an emission signal reflected from the target screening area 18A as further illustrated in FIGS. 2 and 3. The hyperspectral imaging camera 22 is configured to detect light in the visible light range of about 390 nm to 710 nm.

As such, a detector module 22A of the hyperspectral imaging camera 22 may comprise a silicon-based detector device which detects visible light. Silicon-based detector devices have the advantage of being considerably less expensive than, for example, Indium Galium Arsenide (InGaAs) detector devices which operate in the infrared light range.

The system 10 may include an optical light pathway system 24 for focusing and/or collimating the emission signal reflected from the target screening area 18A.

The processor module 16 is configured by the machine-readable instructions to process or analyze the collected emission signal to determine any one or more of: size, distribution, and plastics material types of the microplastic particles 12A in the sample 12.

Hyperspectral imaging collects and processes information from across the electromagnetic spectrum, although, in the present invention, the hyperspectral imaging camera 22 is configured to collect light information in preferably only the visible light range. The goal of hyperspectral imaging is to obtain the spectrum for each pixel in the image of a scene or the target screening area 18A, with the purpose of detecting objects such as, in the case of the invention, microplastic particles as small as ~10 µm, and identifying materials of such objects.

Whereas the human eye sees color of visible light in mostly three bands (long wavelengths—perceived as red, medium wavelengths—perceived as green, and short wavelengths—perceived as blue), spectral imaging divides the spectrum into many more bands as illustrated in FIG. 2. In hyperspectral imaging, the recorded spectra have fine wavelength resolution and cover a wide range of wavelengths.

Hyperspectral sensors or detectors such as detector 22A collect information as a set of 'images'. Each image represents a narrow wavelength range of the visible light spectrum, also known as a spectral band. These 'images' are combined to form a three-dimensional (x,y,λ) hyperspectral data cube 26 (FIG. 2) for processing and analysis, where x and y represent two spatial dimensions of the imaged scene, and λ represents the spectral dimension comprising a narrow range of wavelengths. The precision of the detector 22A is measured in spectral resolution, which is the width of each band of the spectrum that is captured. Where a large number of fairly narrow frequency bands is captured, it is possible to identify objects even if they are only captured in one pixel or a handful of pixels. If the pixels are too large, then multiple objects may be captured in the same pixel and become difficult to identify. If the pixels are too small, then the intensity captured by each sensor cell may be low, and the decreased signal-to-noise reduces the reliability of measured features. The acquisition and processing of hyperspectral images is also referred to as imaging spectroscopy or, with reference to the hyperspectral cube 26, as 3D spectroscopy.

Figure 4:
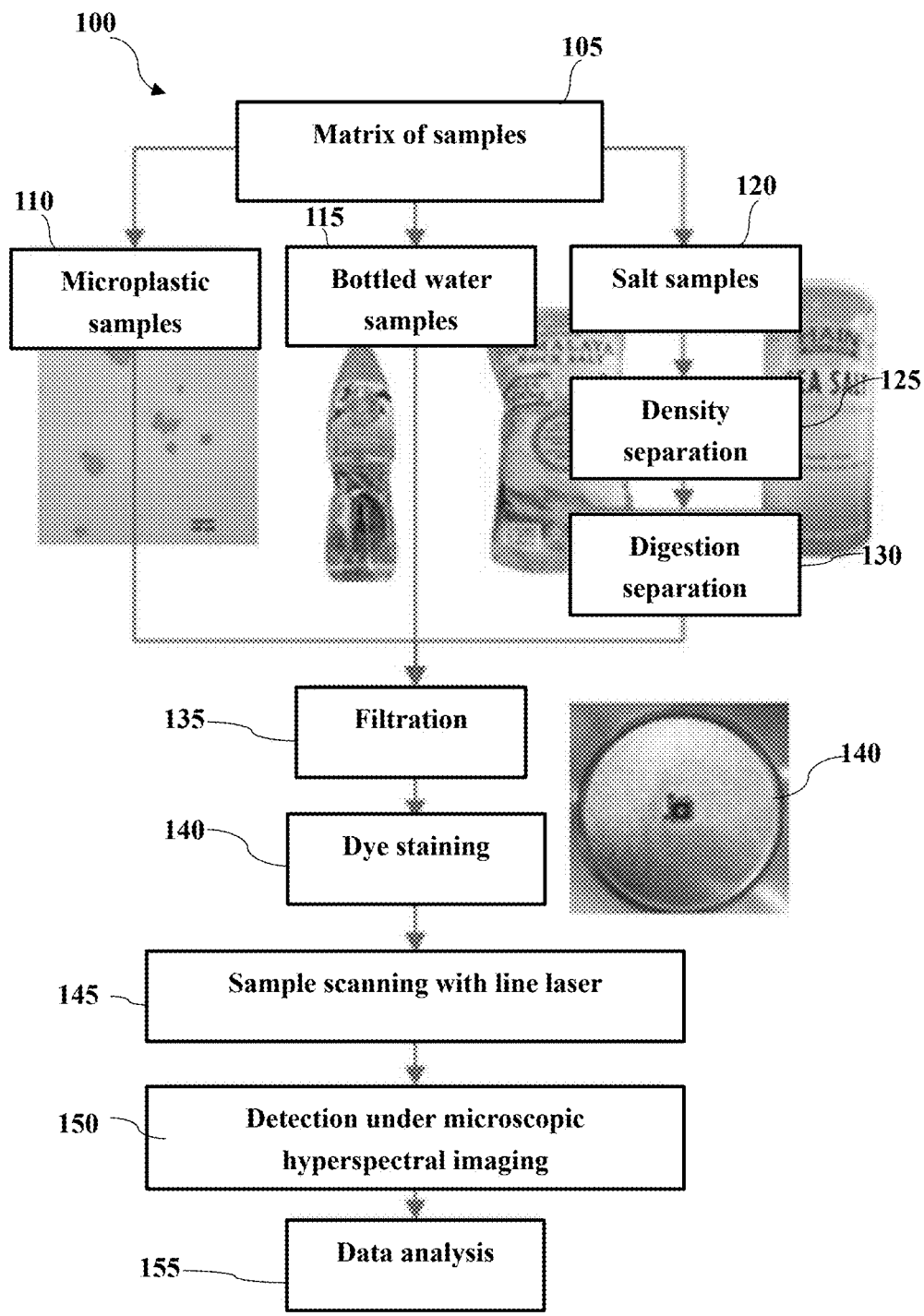
FIG. 4 is a flow diagram of a method in accordance with the invention.

Referring to FIG. 4, shown is one method 100 in accordance with the invention. This method 100 commences with preparation of the sample of microplastic particles 12 from a matrix of samples 105. The matrix of samples 105 may include microplastic samples 110, aqueous samples 115 such as bottled water, or solid samples 120 such as rock or granular salt samples.

In the case of the solid samples 120, it will be necessary to dissolve the solid samples 120 in a liquid such as water to prepare the solid samples 120 for further processing. The further processing steps of the solid samples 120 dissolved in water may comprise one or both of a density separation process 125 and a digestion separation process 130.

In a next step, each of the matrix of samples 105 is subject to a filtration process 135 to thereby obtain the samples of microplastic particles 12 in a form suitable for staining by the fluorescent dye Nile Red.

The dye staining step 140 is a precursor to using the system 10 to implement the steps of: line scanning 145 the samples of microplastic particles 12 with the line laser 20; detecting 150 microplastic particles 12A by collecting the emission signal reflected from the samples of microplastic particles 12 using the hyperspectral imaging camera 22; and then analyzing 155 the collected image data using the processor 16. The collected emission signal may be analyzed by the processor 16 using a hyperspectral imaging analysis algorithm to determine at least the plastics material types of the microplastic particles 12A in the samples 12.

Figure 5:
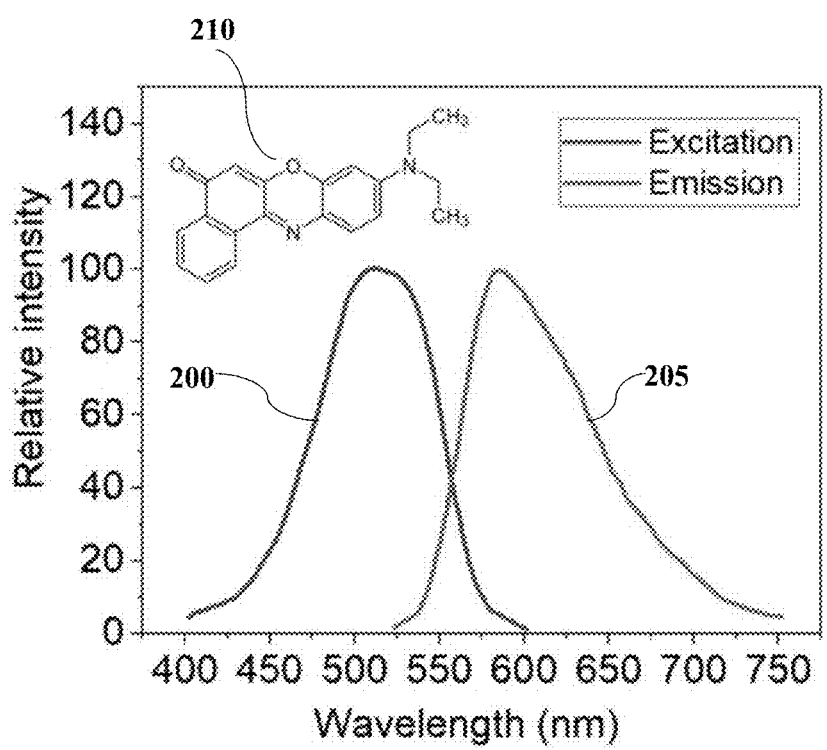
FIG. 5 is a graph comparing the excitation intensity-wavelength profile to the reflected emission intensity-wavelength profile for a typical fluorescent dye Nile Red.

Reference is made to FIG. 5 which provides a graph comparing the excitation intensity-wavelength profile 200 to the reflected emission intensity-wavelength profile 205 for a fluorescent dye Nile Red (with the chemical structure shown by numeral 210). It will be seen that the excitation light is within the visible light range and the reflected emission light is also within the visible light range. Consequently, it is possible to hyperspectrally image said emission light using a Silicon-based detector which can be obtained for a few US$ (dollars) compared to an InGaAs detector can cost in the range of thousands of US$.

Figure 6A:
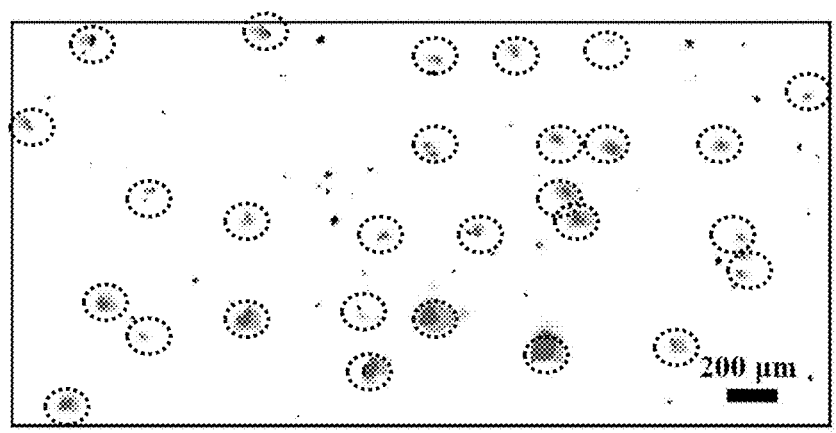
FIG. 6A is an overlap of an optical image of microplastic particles with a processed hyperspectral image illustrating the identification of microplastic particles in a scanned sample.
Figure 6B:
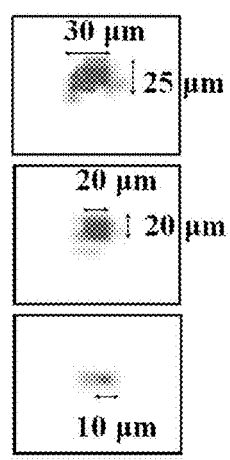
FIG. 6B illustrates dimensions of some identified particles in FIG. 6A.

FIG. 6A provides an overlap of an optical image of microplastic particles with a processed hyperspectral image obtained by the foregoing method 100 illustrating the identification of microplastic particles 12A in a scanned sample 12 with dimensions of some of such particles 12A indicated in FIG. 6B, said dimensions being as small as ~10 μm. The dashed line circle in FIG. 6 highlights the particles identified as microplastic particles 12A. Within the dashed lines circles, the dark grey images comprise the imaged particles and the light grey images comprise the algorithm processed hyperspectral image highlighting the particles identified as microplastic particles 12A. It will be understood that the samples of microplastic particles 12 may include particles of other non-plastics material waste.

One problem which arises is that, for small microplastic particles 12A, the peak wavelength of the respective emission intensity-wavelength profiles for PE and PET are close such that it can be difficult to discriminate between PE and PET microplastic particles 12A when seeking to identify the plastics material types of said microplastic particles 12A.

Figure 7A:
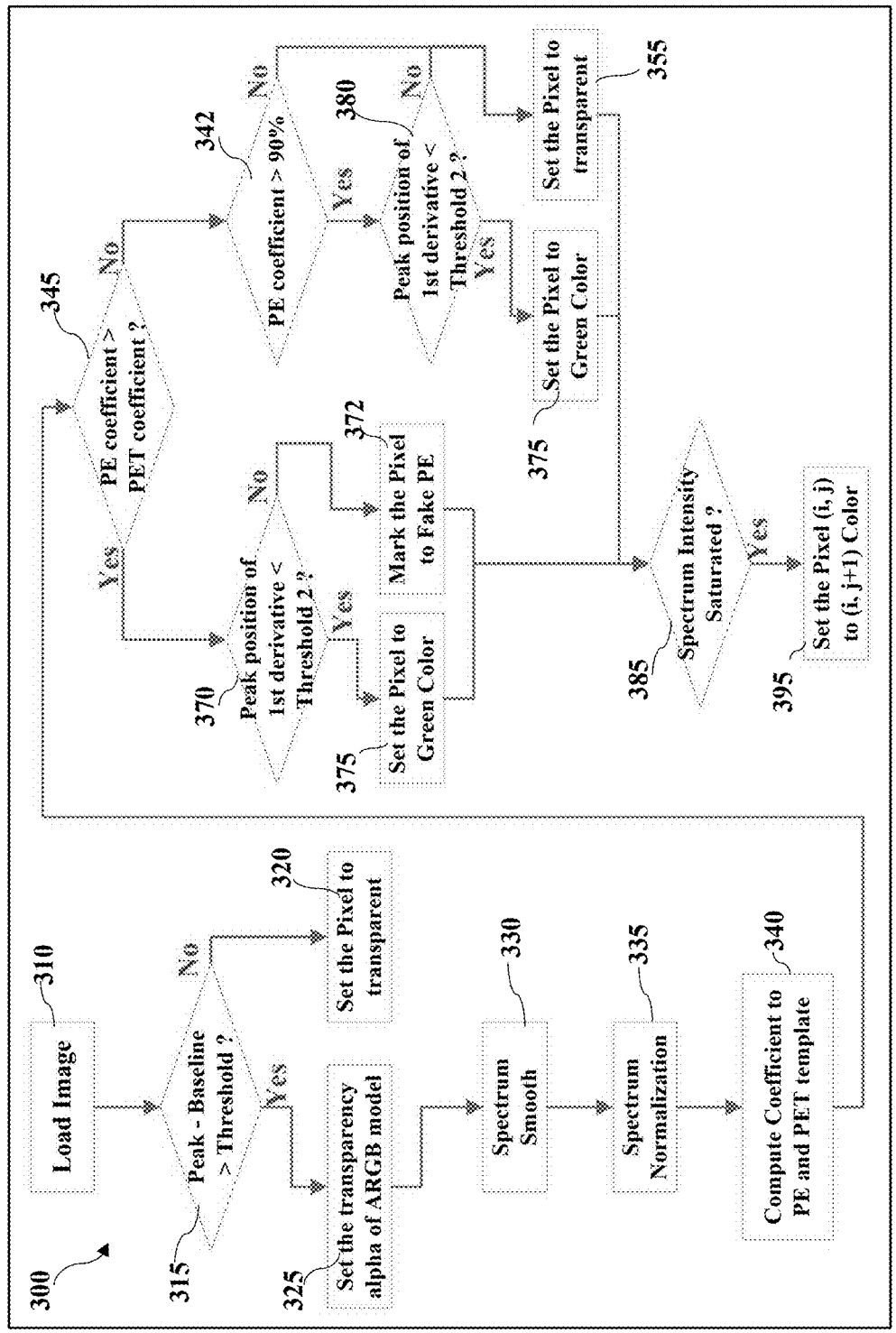
FIG. 7A is a flow diagram of an algorithm for preliminary identification of small microplastic polyethylene (PE).

FIG. 7A provides a flow diagram of an algorithm 300 in accordance with an aspect of the invention for preliminary identification of PE microplastic particles 12A.

Figure 7B:
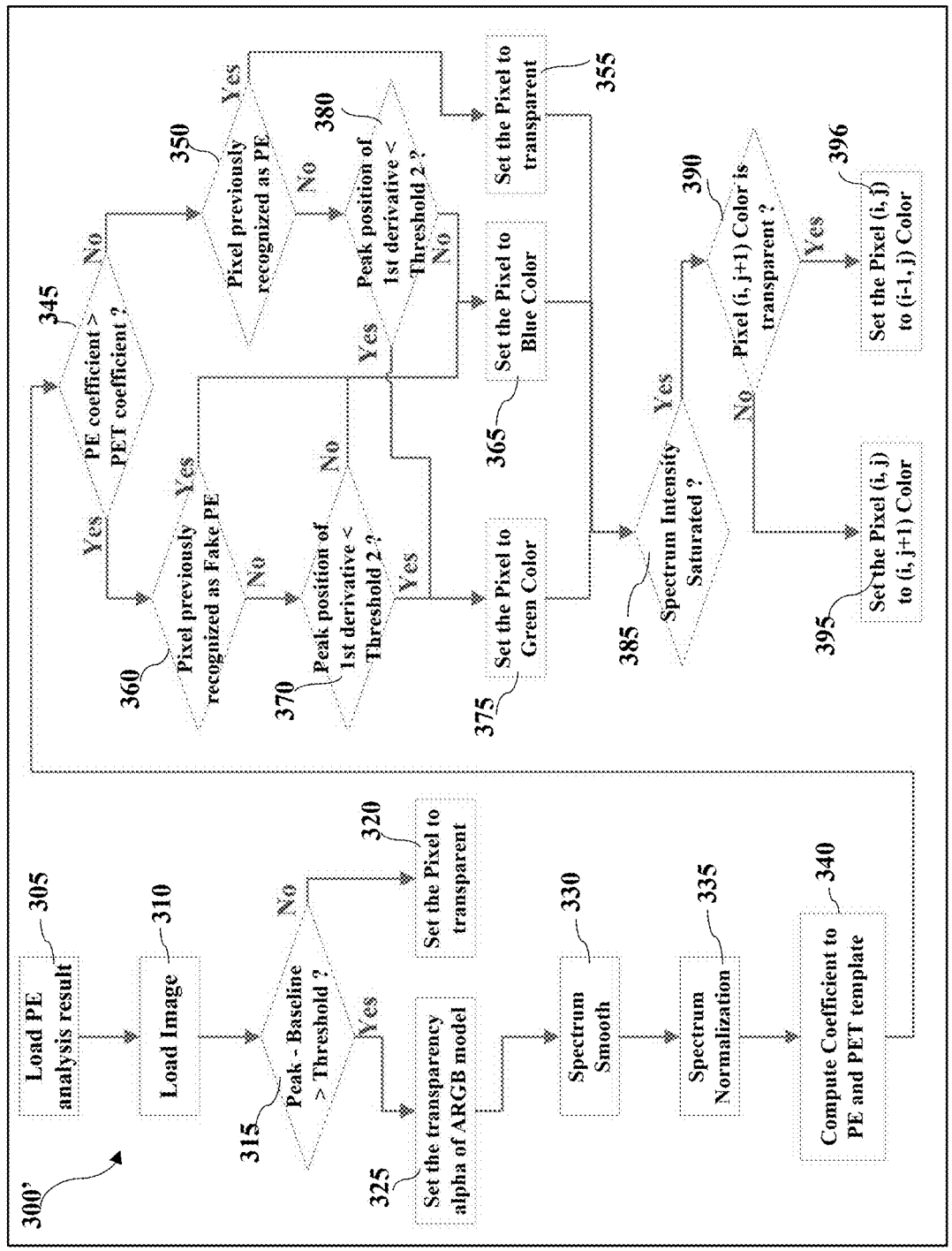
FIG. 7B is a flow diagram of an algorithm to distinguish between small PE and polyethylene terephthalate (PET) microplastic particles.
Figure 9A:
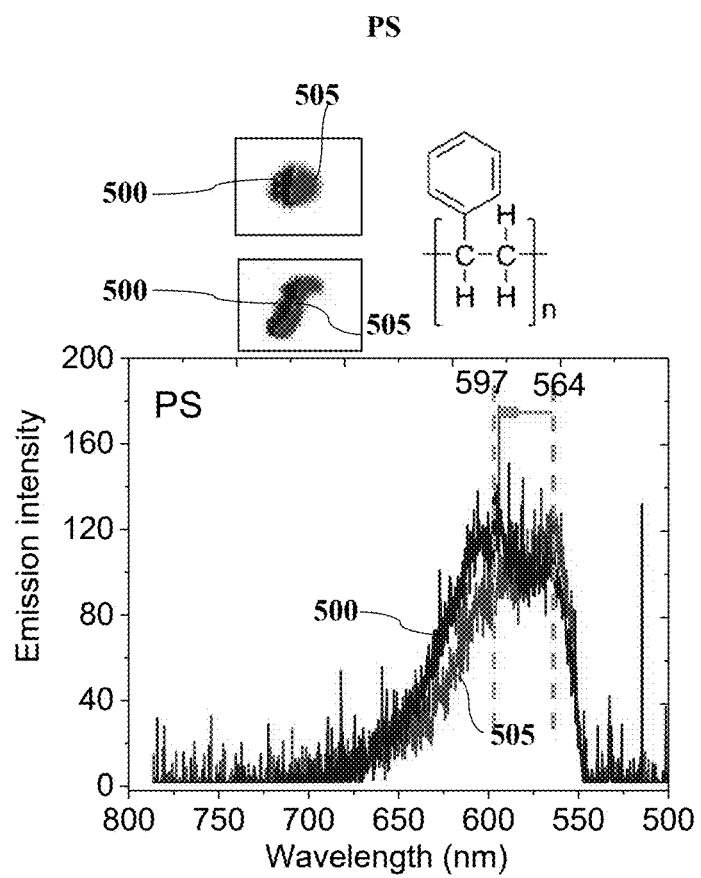
FIG. 9A shows the emission intensity-wavelength profile for polystyrene (PS) dyed with Nile Red.
Figure 9B:
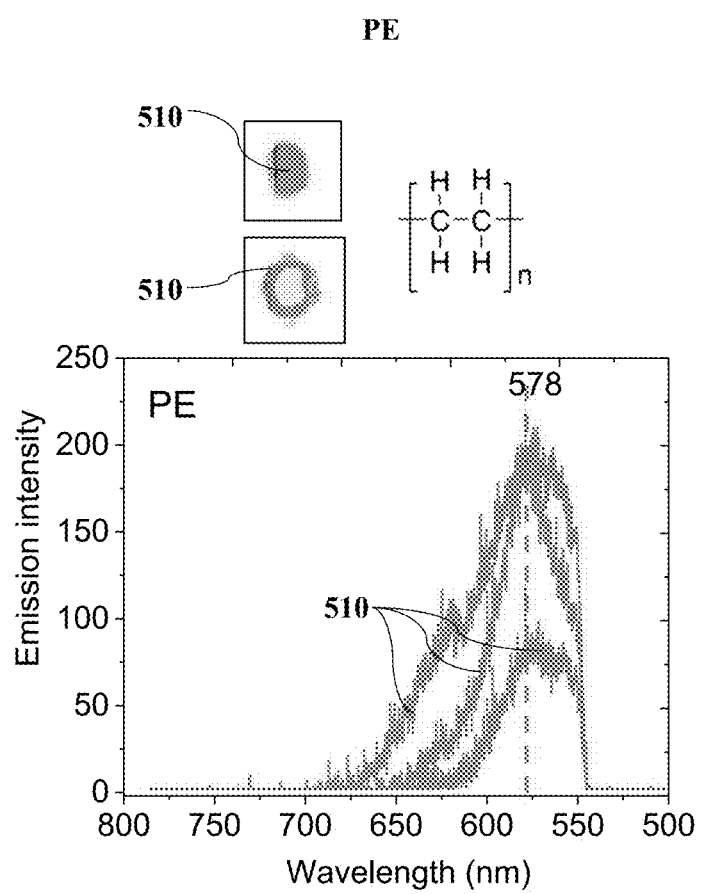
FIG. 9B shows the emission intensity-wavelength profile for PE dyed with Nile Red.
Figure 9C:
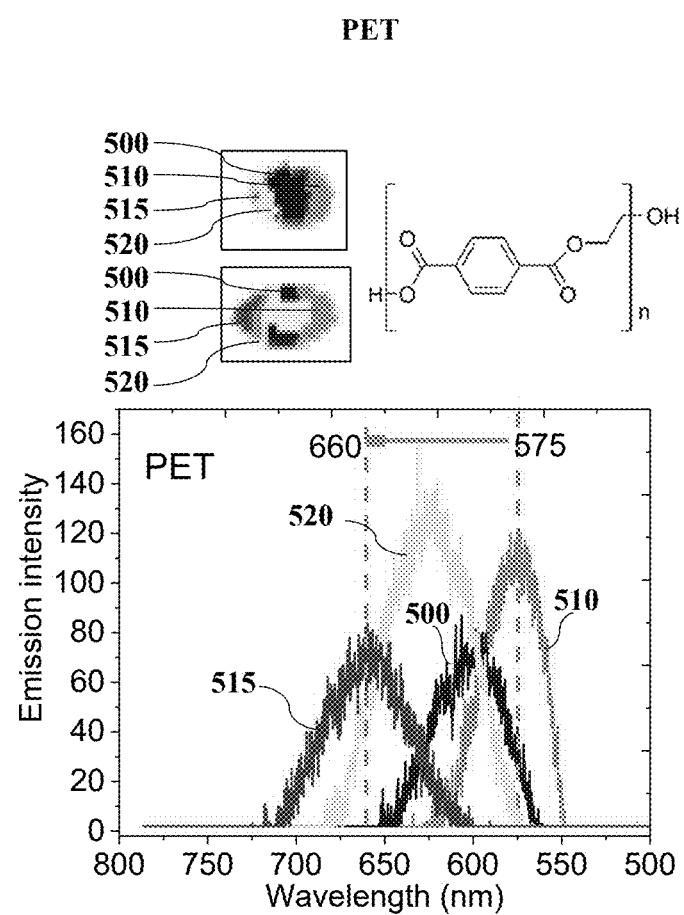
FIG. 9C shows the emission intensity-wavelength profile for PET dyed with Nile Red.
Figure 9D:
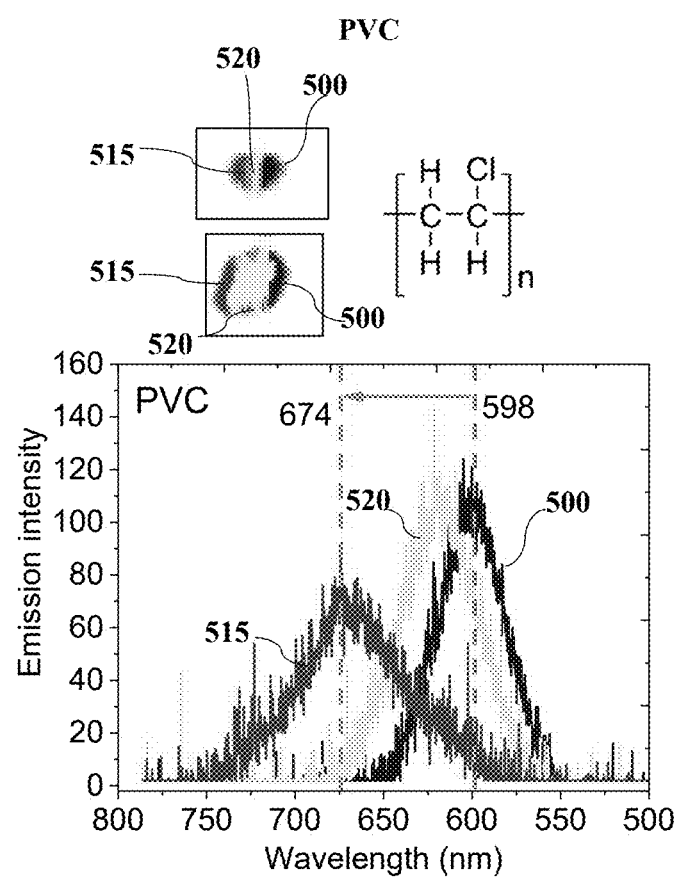
FIG. 9D shows the emission intensity-wavelength profile for polyvinyl chloride (PVC) dyed with Nile Red.

FIG. 7B provides a flow diagram of an algorithm 300' in accordance with an aspect of the invention to more easily distinguish between small PE and PET microplastic particles 12A.

In this connection, reference is made to FIG. 8A which shows the closeness of the peak wavelength of the emission intensity-wavelength profile for PE 400 relative to the peak wavelength of the emission intensity-wavelength profile for PET 405. Referring to FIG. 8B, the algorithms 300, 300' may make use of the first derivative 400' of the emission intensity-wavelength profile for PE 400 and the first derivative 405' of the emission intensity-wavelength profile for PET 405.

Machine-readable instructions for the algorithms 300, 300' are preferably stored in the memory 14 of the system 10 for execution by the processor 16.

Referring again to FIG. 7A, the algorithm 300 commences with step 310 where a hyperspectral image is loaded to the memory 14. Consequently, the algorithm 300 commences determining whether or not the microplastic particle 12 is a PE microplastic particle in the sample 12 by first identifying or setting the emission intensity-wavelength profile for a pixel as a preliminary PE classification and then conducting an identification process for PET using the preliminary PE classification as a reference for comparison and discrimination.

A next stage of the algorithm 300 is to assess each pixel of the uploaded hyperspectral image to determine whether each pixel provides an effective signal. This is achieved by comparing a difference between a peak intensity and a baseline intensity of the emission intensity-wavelength profile for each pixel in said uploaded image with a first predetermined threshold value. Consequently, in decision box 315, a decision is made as to whether or not the difference between a peak intensity and a baseline intensity of the emission intensity-wavelength profile for each pixel in the image is greater than the first threshold value. If the decision is "no", then, in step 320, the pixel being assessed is considered as not providing an effective signal for further processing and the pixel is designated as "transparent" with a value of zero in the ARGB color model. The designation "transparent" signifies the pixel as not being able to determine the presence of a microplastic particle 12A in the sample 12. Any other suitable designation for such a pixel could be used. The algorithm 300 preferably terminates processing of the emission signal for any pixel deemed not to provide an effective signal. If the decision is "yes" then the pixel being assessed is considered as providing an effective signal for further processing. Decision box 315 and step 320 may be optional in some embodiments. In a next step 325, the transparency alpha for the ARGB model is set for the pixel being assessed and judged to provide an effective signal, preferably with a value assigned to said pixel related to the opaqueness of said pixel.

The algorithm 300 may include an optional step 330 of smoothing the spectrum of each assessed image pixel deemed to provide an effective signal. The algorithm 300 may also include an optional step 335 of normalizing the spectrum of the each assessed image pixel deemed to provide an effective signal.

In a next step 340, algorithm 300 determines a value of a fitting coefficient of the emission intensity-wavelength profile for each pixel deemed to provide an effective signal with respect to a stored template emission intensity-wavelength profile for PE and also with respect to a stored template emission intensity-wavelength profile for PET. The templates may be stored in a database provided by the memory 14 or in a remote database. In a decision box 345, the determined value of the fitting coefficient for PE is compared to the determined value of the fitting coefficient for PET. This is done for each assessed image pixel deemed to provide an effective signal. If the value of the fitting coefficient for PE is determined to be not greater than the value of the fitting coefficient for PET then, at decision box 342, a determination is made as to whether or not the pixel being assessed has a PE fitting coefficient greater than a predetermined level which, in this example, is 90%. If the determination is "no" then, at step 355, the pixel is designated as "transparent".

Returning to decision box 345, if the determination is made that the value of the fitting coefficient for PE is greater than the value of the fitting coefficient for PET then, at decision box 370, a determination is made as to whether or not a peak wavelength position of the first order derivative of the emission intensity-wavelength profile for said pixel satisfies the condition that the value of the peak wavelength is less than a second threshold value, hereinafter "threshold 2" value. The threshold 2 value is preferably determined by an average of the peak wavelength values of PE and PET, extracted from the corresponding first order derivatives of the template emission intensity-wavelength profiles for PE and PET. If the determination is "yes", then, at step 375, the pixel is designated as "green" signifying that said pixel comprises a PE microplastic particle 12A. If at decision box 370 the determination is "no" then the algorithm 300 designates at step 372 that the pixel comprises a fake PE microplastic particle 12A.

Returning to decision box 342, if the determination is "yes", the algorithm 300 proceeds to decision box 380 where a determination is made as to whether or not a peak wavelength position of the first order derivative of the emission intensity-wavelength profile for said pixel satisfies the condition that the value of the peak wavelength is less than the threshold 2 value. If the determination is "yes", then, at step 375, the pixel is designated as "green" signifying that said pixel comprises a PE microplastic particle 12A. However, if at decision box 380 the determination is "no" then the algorithm 300 implements step 355 by designating the pixel as "transparent".

The algorithm 300 may be terminated at this stage having distinguished whether or not a detected particle is a small PE microplastic particle 12A. However, in some embodiments, the algorithm 300 may proceed to decision box 385 where a determination is made on whether the intensity of the spectrum for a pixel is saturated. If the determination is "yes" then the algorithm 300 proceeds to step 395 by setting the pixel (i, j) to (i, j+1) color. Considering the fact that, when scanning a microplastic particle which has very strong signals, the pixel intensity along the scanning direction (−j axis, for the algorithm 300 and the system 10) will first come into a no signal region (transparent), and then an unsaturated signal region and finally a saturated signal region. Therefore, if the nearest pixel of a saturated one is neither transparent nor saturated, it could be taken as a reference for identification of the affiliation of the saturated pixels.

Referring again to FIG. 7B, the algorithm 300' commences on the assumption that a microplastic particle 12A initially identified as possibly a PE particle or a PET particle is to be considered to be a PE particle. In the following description of algorithm 300', like numerals to those used in the description of algorithm 300 (FIG. 7A) will be used to denote like processes and/or decisions.

In a first step 305, the analysis result on which the initial assumption is based that the microplastic particle 12A is a PE particle is loaded into the memory 14 for processing by the processor 16. In a next step 310, the hyperspectral image (the integration time of the laser line scan for acquisition of this hyperspectral image can be adjustable for realizing higher sensitivity considering the different photoluminescence efficiency of Nile Red dye absorbed on PE and PET) on which the analysis result was based is loaded to the memory 14. Consequently, the algorithm 300' commences discriminating between a PE microplastic particle and a PET microplastic particle in the sample 12 by first identifying or setting the emission intensity-wavelength profile for a pixel as a preliminary PE classification and then conducting an identification process for PET using the preliminary PE classification as a reference for comparison and discrimination.

A next stage of the algorithm 300' is to assess each pixel of the uploaded hyperspectral image to determine whether each pixel provides an effective signal. Consequently, at decision box 315, a decision is made as to whether or not the difference between a peak intensity and a baseline intensity of the emission intensity-wavelength profile for each pixel in the image is greater than the first threshold value. If the decision is "no", then, in step 320, the pixel being assessed is considered as not providing an effective signal for further processing and the pixel is designated as "transparent" with a value of zero in the ARGB color model. The algorithm 300' preferably terminates processing of the emission signal for any pixel deemed not to provide an effective signal. If the decision is "yes" then the pixel being assessed is considered as providing an effective signal for further processing. As with algorithm 300, the decision box 315 and step 320 may be optional in some embodiments. In a next step 325, the transparency alpha for the ARGB model is set for the pixel being assessed and judged to provide an effective signal, preferably with a value assigned to said pixel related to the opaqueness of said pixel.

The algorithm 300' may also include an optional step 330 of smoothing the spectrum of each assessed image pixel deemed to provide an effective signal. The algorithm 300' may also include an optional step 335 of normalizing the spectrum of the each assessed image pixel deemed to provide an effective signal.

In a next step 340, algorithm 300' determines a value of a fitting coefficient of the emission intensity-wavelength profile for each pixel deemed to provide an effective signal with respect to a stored template emission intensity-wavelength profile for PE and also with respect to a stored template emission intensity-wavelength profile for PET. In a decision box 345, the determined value of the fitting coefficient for PE is compared to the determined value of the fitting coefficient for PET. If the value of the fitting coefficient for PE is determined to be not greater than the value of the fitting coefficient for PET then, at decision box 350, a determination is made as to whether or not the pixel being assessed was previously recognized or identified as a PE microplastic particle 12A. If the determination is "yes" then, at step 355, the pixel is designated as "transparent".

Returning to decision box 345, if the determination is made that the value of the fitting coefficient for PE is greater than the value of the fitting coefficient for PET then, at decision box 360, a determination is made as to whether or not the pixel being assessed was previously recognized or identified as being a "fake" PE microplastic particle 12A. If the determination is "yes" than, at step 365, the pixel is designated as "blue" signifying that said pixel comprises a PET microplastic particle 12A.

If at decision box 360 the determination is "no" then, at decision box 370, a determination is made as to whether or not a peak wavelength position of the first order derivative of the emission intensity-wavelength profile for said pixel satisfies the condition that the value of the peak wavelength is less than the threshold 2 value. If the determination is "yes", then, at step 375, the pixel is designated as "green" signifying that said pixel comprises a PE microplastic particle 12A. If at decision box 370 the determination is "no" then the algorithm 300' implements step 365 by designating the pixel as "blue" signifying that said pixel comprises a PET microplastic particle 12A.

Returning to decision box 350, if the determination is "no", the algorithm 300' proceeds to decision box 380 where a determination is made as to whether or not a peak wavelength position of the first order derivative of the emission intensity-wavelength profile for said pixel satisfies the condition that the value of the peak wavelength is less than the threshold 2 value. If the determination is "yes", then, at step 375, the pixel is designated as "green" signifying that said pixel comprises a PE microplastic particle 12A. However, if at decision box 380 the determination is "no" then the algorithm 300' implements step 365 by designating the pixel as "blue" signifying that said pixel comprises a PET microplastic particle 12A.

The algorithm 300' may be terminated at this stage having distinguished between small PE and PET microplastic particles 12A. However, in some embodiments, the algorithm 300' may proceed to decision box 385 where a determination is made on whether the intensity of the spectrum for a pixel is saturated. If the determination is "no" then the algorithm 300' terminates with the distinction between small PE and PET microplastic particles 12A having been completed. If the determination is "yes" then the algorithm 300' proceeds to decision box 390 where a determination is made as to whether or not the pixel (i, j+1) is designated "transparent". If the determination is "no" then, at step 395, the pixel (i, j) is set to (i, j+1) color. If the determination is "yes" then, at step 396, the pixel (i, j) is set to (i−1, j) color.

The method of the invention enables the existence of larger microplastic particles 12A of a range of plastics material types, e.g., PS, PE, PET, and PVC, to be identified based on emission spectrum peak wavelength shift information from the target particle signal area, e.g. the pixel or pixels in the hyperspectral image determined to comprise a particle. This involves: collecting the emission spectrum peak wavelength shift information from the target particle signal area for various wavelengths; and evaluating spatial peak position shift on each extracted potential microplastic particle area. Preferably, this is based on start and end emission peak positions along the laser 20 line scanning direction. This enables plastics material types of different microplastic particles 12A to be distinguished from one another. In some embodiments, this comprises distinguishing between PS, PE, PET, and PVC microplastic particles 12A as these plastics material types comprise the most significant quantities of plastics waste material.

Reference is made here to FIGS. 9A-D which respectively show the emission intensity-wavelength profiles for PS, PE, PET, and PVC.

The emission intensity-wavelength profile for PS comprises blue light 500 and green light 505.

The emission intensity-wavelength profile for PE comprises lime green light 510.

The emission intensity-wavelength profile for PET comprises red light 515, yellow light 520, lime green light 510, and blue light 500.

The emission intensity-wavelength profile for PVC comprises red light 515, yellow light 520, and blue light 500.

A plastics material type of a microplastic particle 12A in the sample 12 may be determined by matching its emission intensity-wavelength profile obtained from the collected emission signal with a stored template emission intensity-wavelength profile for a specified plastics type of microplastic particle. This can be achieved based on one or more wavelengths of the emission intensity peaks obtained from the emission intensity-wavelength profiles for the pixels of the emission hyperspectral image.

In some embodiments, the method may comprise or include an adaptable integration time setting for the laser line scan of an area of the microplastics sample 12 as different plastics material types have different integration times. The emission signal (pixel) saturation issue can be resolved by adjusting the integration time of the hyperspectral imaging camera 22. The adaptable integration time setting is integrated in the program controlling the movement of the motorized sample holder 18 and or the line laser 20.

The invention also provides a non-transitory computer-readable medium storing machine-readable instructions, wherein, when the machine-readable instructions are executed by the processor 16, they configure the system 10 to implement the method of any one of the appended method claims.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of screening a sample of microplastic particles which have been stained using a fluorescent dye, the method comprising:
    line scanning the stained sample of microplastic particles using a line laser;
    collecting an emission signal from the sample of microplastic particles using a visible light range hyperspectral imaging device; and
    analyzing the collected emission signal to determine any one or more of: size, distribution, and plastics material types of the microplastic particles in the sample.

2. The method of claim 1, wherein the fluorescent dye comprises any of: a lipophilic dye; a hydrophobic dye; or a lipophilic and hydrophobic dye.

3. The method of claim 1, wherein the sample of microplastic particles is obtained from a liquid sample and the method includes, prior to staining the sample of microplastic particles, processing the liquid sample to separate the sample of microplastic particles from a liquid of the liquid sample.

4. The method of claim 3, wherein the step of processing the liquid sample comprises using any of density separation, filtration, or digestion separation to separate the sample of microplastic particles from the liquid.

5. The method of claim 1, wherein the sample of microplastic particles is obtained from a solid sample and the method includes, prior to staining the sample of microplastic particles, processing the solid sample by dissolving the solid sample in a liquid to obtain a liquid sample, and then processing the liquid sample to separate the sample of microplastic particles from the liquid of the liquid sample.

6. The method of claim 1, wherein the fluorescent dye is first dissolved in a solvent prior to staining the sample of microplastic particles.

7. The method of claim 1, wherein the step of staining the sample of microplastic particles using the fluorescent dye is conducted for a predetermined incubation period.

8. The method of claim 1, wherein the fluorescent dye comprises Nile Red.

9. The method of claim 1, wherein the collected emission signal from the sample of microplastic particles is a reflectance emission signal from the sample of microplastic particles.

10. The method of claim 1, wherein the collected emission signal is analyzed using a hyperspectral imaging analysis algorithm to determine at least the plastics material types of the microplastic particles in the sample.

11. The method of claim 1, wherein a plastics material type of a microplastic particle in the sample is determined by matching an emission intensity-wavelength profile obtained from the collected emission signal for said microplastic particle to a stored template emission intensity-wavelength profile for a specified plastics type of microplastic particle.

12. The method of claim 1, further comprising discriminating between a polyethylene (PE) microplastic particle and a polyethylene terephthalate (PET) microplastic particle in the sample by:
    determining a value of a fitting coefficient of an emission intensity-wavelength profile from the collected emission signal for a first microplastic particle matched to a stored template emission intensity-wavelength profile for PE;
    determining a value of a fitting coefficient of an emission intensity-wavelength profile from the collected emission signal for a second microplastic particle matched to a stored template emission intensity-wavelength profile for PET;
    determining a peak wavelength position of a first order derivative of the emission intensity-wavelength profile of the first microplastic particle;
    determining a peak wavelength position of a first order derivative of the emission intensity-wavelength profile of the second microplastic particle; and
    distinguishing between the PE microplastic particle and the PET microplastic particle based on the determined respective values of the fitting coefficients and the determined respective first order derivative peak positions for the first and second microplastic particles.

13. The method of claim 1, wherein the collected emission signal comprises an emission hyperspectral image, the method further comprising:
    determining a value of a fitting coefficient of an emission intensity-wavelength profile for each pixel of the emission hyperspectral image to a stored template emission intensity-wavelength profile;
    determining a peak wavelength of a first order derivative of the emission intensity-wavelength profile for each pixel; and
    distinguishing between a PE microplastic particle and a PET microplastic particle based on the determined respective values of the fitting coefficients and the determined respective first order derivative peak positions for the pixels.

14. The method of claim 13, further comprising:
    prior to determining the value of a fitting coefficient for a pixel, determining an effective emission signal for said pixel by comparing a difference between a peak intensity and a baseline intensity of the emission intensity-wavelength profile for said pixel with a threshold value and, if the comparison is less than or equal to the threshold then terminating processing of the emission signal for said pixel.

15. The method of claim 13, further comprising:
    prior to determining the value of a fitting coefficient for a pixel, smoothing and/or normalizing the emission intensity-wavelength profile for said pixel.

16. The method of claim 13, further comprising discriminating between a PE microplastic particle and a PET microplastic particle in the sample by first conducting an identification process for PE and then conducting an identification process for PET using preliminary PE classification results as a reference.

17. The method of claim 16, wherein the collected emission signal comprises an emission hyperspectral image, the method further comprising: determining the plastics material types of the microplastic particles in the sample based on one or more wavelengths of emission intensity peaks obtained from emission intensity-wavelength profiles for the pixels of the emission hyperspectral image.

18. The method of claim 17, further comprising:
    collecting peak wavelength shift information for the emission intensity-wavelength profiles from the emission signal;
    evaluating spatial peak position shift value for the emission intensity-wavelength profile; and
    distinguishing between plastics material types of different microplastic particles (PE, PET, polystyrene (PS), polyvinyl chloride (PVC)) based on the evaluated spatial peak position shift value for the emission intensity-wavelength profiles.

19. The method of claim 1, wherein the emission signal collection process comprises an adaptable integration time setting for the laser line scan of an area of the microplastics sample.

20. A system for screening a sample of microplastic particles, said sample of microplastic particles having been stained using a fluorescent dye, the system comprising:
- a sample holder comprising a target screening area, the sample of microplastic particles being placed in or on the sample holder;
- a line laser arranged to line scan the target screening area;
- a hyperspectral imaging device arranged to receive an emission signal reflected from the target screening area; and
- a processor module for analyzing the collected emission signal to determine any one or more of: size, distribution, and plastics material types of the microplastic particles in the sample.

* * * * *